US009651004B2

United States Patent
Zhang

(10) Patent No.: US 9,651,004 B2
(45) Date of Patent: May 16, 2017

(54) METHOD AND SYSTEM FOR VACUUM GENERATION USING A THROTTLE COMPRISING A HOLLOW PASSAGE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 193 days.

(21) Appl. No.: 14/707,882

(22) Filed: May 8, 2015

(65) Prior Publication Data

US 2016/0326996 A1 Nov. 10, 2016

(51) Int. Cl.
*F02M 35/10* (2006.01)
*F02D 9/02* (2006.01)

(52) U.S. Cl.
CPC ......... *F02M 35/10229* (2013.01); *F02D 9/02* (2013.01)

(58) Field of Classification Search
CPC .... F02M 35/10; F02M 35/10229; F02D 9/02; F02D 9/08; F02D 9/101; F02D 11/10
See application file for complete search history.

(56) References Cited

U.S. PATENT DOCUMENTS

| | | | | |
|---|---|---|---|---|
| 2,140,529 | A | * | 12/1938 | Kemp ....................... F02D 9/00 137/382 |
| 4,178,890 | A | * | 12/1979 | Yamabe ................... F02D 11/08 123/320 |
| 5,007,395 | A | | 4/1991 | Wakeling |
| 5,515,674 | A | | 5/1996 | Kaufmann, Jr. |
| 7,104,749 | B2 | | 9/2006 | Frutschi |
| 8,181,453 | B2 | | 5/2012 | Goplen et al. |
| 8,261,716 | B2 | | 9/2012 | Bergbauer et al. |
| 8,925,520 | B2 | | 1/2015 | Pursifull et al. |
| 2005/0092944 | A1 | | 5/2005 | Patterson |
| 2009/0301577 | A1 | | 12/2009 | Carter, III et al. |

FOREIGN PATENT DOCUMENTS

EP    1469258 A1    10/2004

OTHER PUBLICATIONS

Zhang, X., "Method and System for Vacuum Generation Using a Throttle," U.S. Appl. No. 14/244,217, filed Apr. 3, 2014, 36 pages.

\* cited by examiner

*Primary Examiner* — Hieu T Vo
(74) *Attorney, Agent, or Firm* — Julia Voutyras; McCoy Russell LLP

(57) ABSTRACT

Various systems and methods are described for generating vacuum within an engine intake. A system may comprise an intake throttle including a throttle plate, where the throttle plate may comprise a hollow interior passage, which in turn may be coupled to a vacuum consumption device. When vacuum is demanded by the vacuum consumption device, the throttle plate may be adjusted to increase airflow through the interior passage and vacuum may be generated at a constricted portion of the interior passage by flowing intake air through the interior passage of the throttle plate.

20 Claims, 7 Drawing Sheets

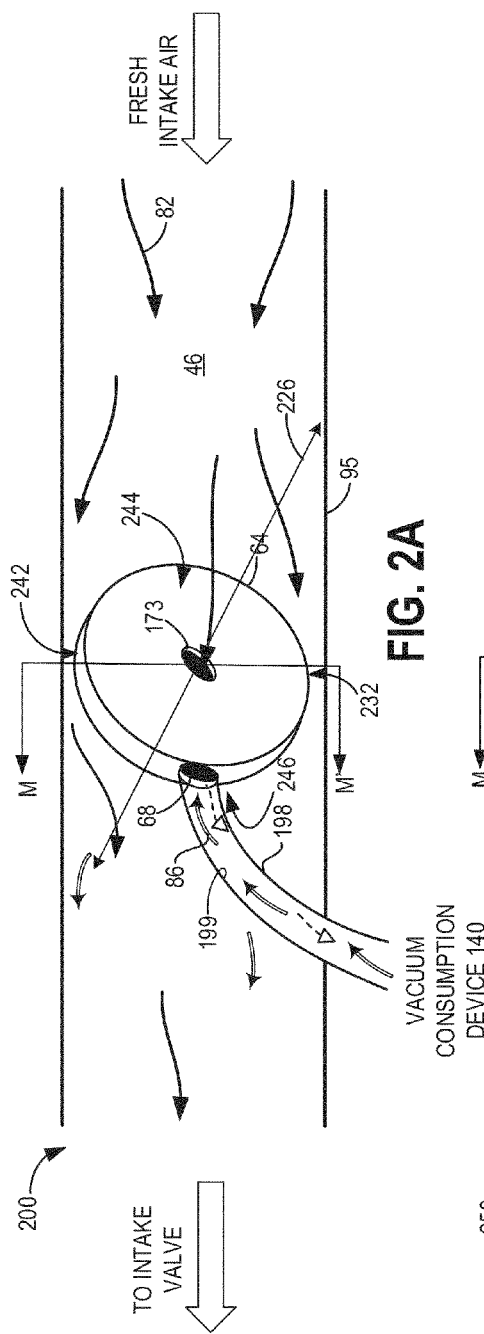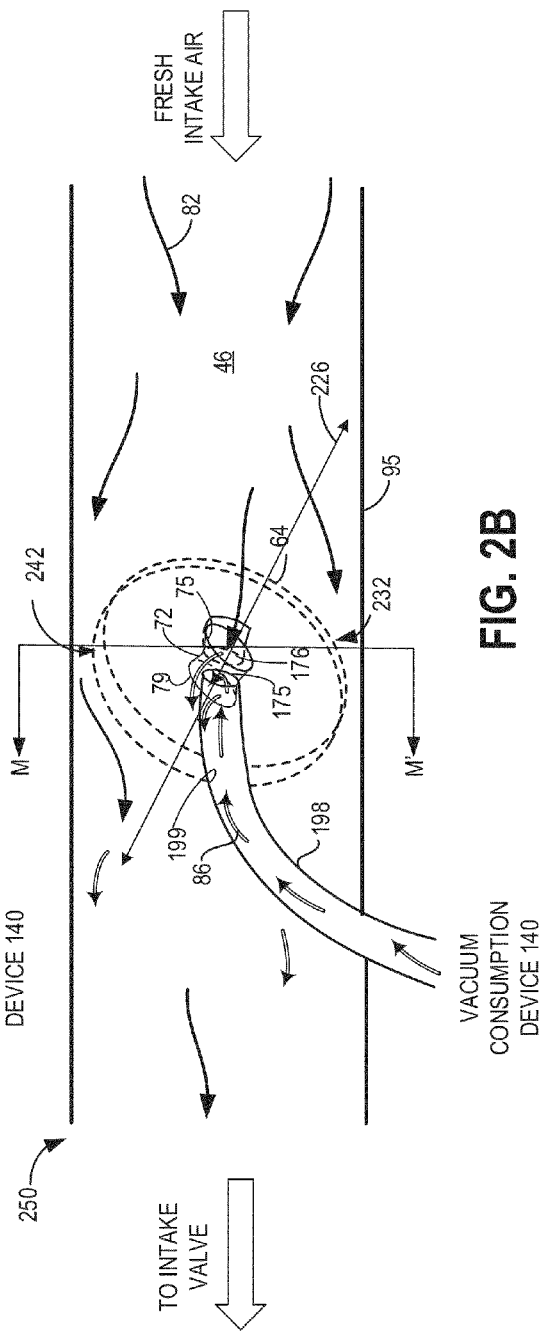

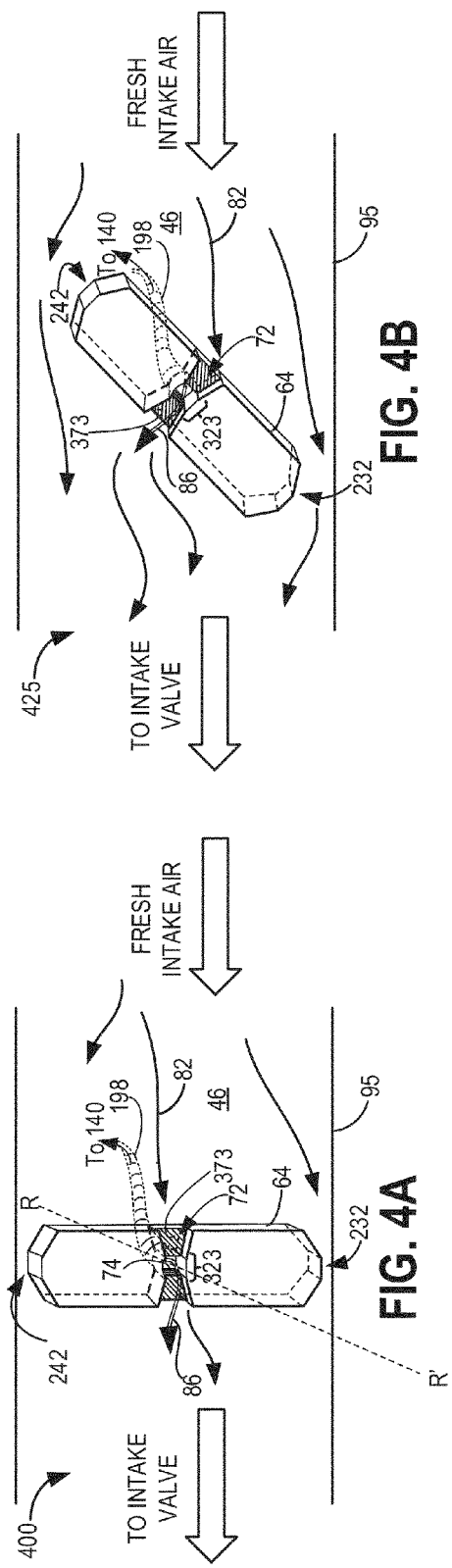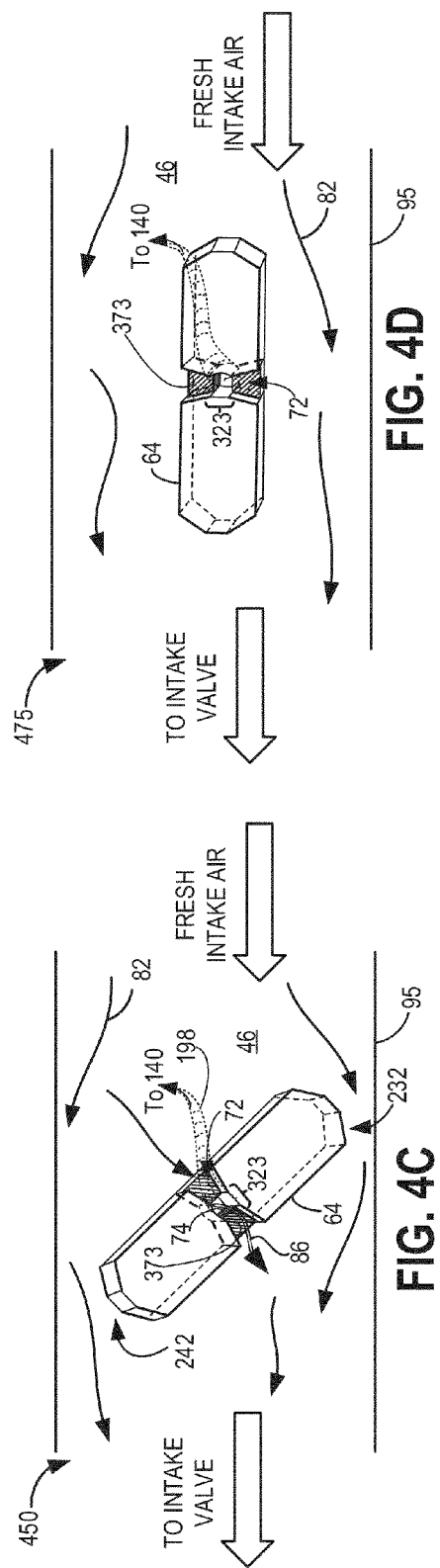

METHOD AND SYSTEM FOR VACUUM GENERATION USING A THROTTLE COMPRISING A HOLLOW PASSAGE

TECHNICAL FIELD

The present application relates to vacuum generation in an intake via a throttle plate.

BACKGROUND AND SUMMARY

Vehicle systems may include various vacuum consumption devices that are actuated using vacuum. These may include, for example, a brake booster and a purge canister. Vacuum used by these devices may be provided by a dedicated vacuum pump. In other embodiments, one or more aspirators (alternatively referred to as ejectors, venturi pumps, jet pumps, and eductors) may be coupled in the engine system that may harness engine airflow and use it to generate vacuum.

In yet another example embodiment shown by Bergbauer et al. in U.S. Pat. No. 8,261,716, a control bore is located in the wall of the intake such that when the throttle plate is at idle position, vacuum generated at the periphery of the throttle is used for a vacuum consumption device. Therein, the positioning of the throttle plate in an idle position provides a constriction at the throttle plate's periphery. The increasing flow of intake air through the constriction results in a venturi effect that generates a partial vacuum. The control bore is sited so as to utilize the partial vacuum for a vacuum consumption device.

However in the approaches described above, the vacuum generation potential of the throttle is limited. For example, a single control bore at one location in the intake, as shown in U.S. Pat. No. 8,261,716, is utilized by the vacuum consumption device even though vacuum may be generated at the entire periphery of the throttle. To use vacuum generated at the entire periphery of the throttle, more control bores may be needed in the intake passage. However, fabricating these control bores may result in significant modifications to the design of the intake passage which can increase related expenses.

In the approaches that use one or more aspirators to generate vacuum, additional expenses may be incurred because of individual parts that form the aspirator including nozzles, mixing and diffusion sections, and check valves. Further, at idle or low load conditions, it may be difficult to control the total air flow rate into the intake manifold since the flow rate is a combination of leakage flow from the throttle and airflow from the aspirator. Typically, an aspirator shut off valve (ASOV) may be included along with the aspirator to control airflow but with added cost. Further, installing aspirators in the intake can lead to constraints on space availability as well as packaging issues.

As such, some approaches so address the above issues include providing a plurality of perforations around a circumference of a hollow intake throttle plate. The throttle plate may be adjusted to a more closed position to generate vacuum via intake airflow past the perforations on the circumference of the throttle plate. The generated vacuum is then applied to a vacuum consumption device fluidly coupled to the throttle plate via a hollow shaft.

The inventors herein have identified potential issues with the above approach. As an example, the vacuum generation potential of the throttle is limited. As an example, the size of the perforations may be limited due to the width of the throttle plate, and therefore the vacuum generation potential of the throttle is limited. Thus, in order to increase the vacuum generated at the periphery of the throttle, the size of the perforations may need to be increased. However, increasing the size of the perforations may result in increases of the size and of the throttle which may result in significant modifications to the design of the intake passage which can increase related expenses.

The inventors herein have identified an approach to at least partly address the above issues. In one example approach, a method may comprise adjusting a position of a throttle plate with a hollow interior passage, and generating vacuum at a constricted portion of the interior passage, via intake airflow through the interior passage of the throttle plate. In this way, the throttle plate can function as an aspirator and supply vacuum to the vacuum consumption device. Further the vacuum generation potential of the throttle plate may be adjusted by adjusted one or more of the position of the throttle plate, and the size of the hollow interior passage in the throttle plate.

As an example, an engine intake throttle may be configured as a throttle plate mounted on a hollow shaft. The hollow shaft may fluidically couple the hollow interior passage of the throttle plate to a vacuum consumption device. When the vacuum demand of the vacuum consumption device coupled to the throttle plate increases, the throttle plate may be adjusted to a more closed position. As a result, vacuum may be generated by the flow of intake air through a constricted portion of the interior passage of the throttle. This vacuum may be applied to the vacuum consumption device by flowing air from the vacuum consumption device through the hollow shaft into the interior passage of the throttle plate and thereon, into intake airflow that flows through the interior passage. Once sufficient vacuum has been generated, the throttle position may be returned to a more open position.

In this way, a venturi flow passage created at a constricted portion of the interior passage can be advantageously used to generate vacuum for a vacuum consumption device. The constricted portion of the interior passage can be used to provide a channel to draw air or gas from the vacuum consumption device via the hollow shaft. By adjusting the location and size of the interior passage, the vacuum generation potential of the throttle plate may be increased. In addition, airflow into the intake manifold can be better controlled by adjusting the distance between the inside of the intake passage and the edge of the throttle plate. Furthermore, since air received from the vacuum consumption device during vacuum application is received substantially at the throttle plate, airflow errors can be better compensated for. By combining the functions of a throttle and an aspirator into a single throttle plate with a hollow interior passage, additional control valves, such as an ASOV, and parts may not be needed. Further, the vacuum generation ability of the throttle is improved without requiring significant modifications to the intake passage. By reducing the number and size of components required for vacuum generation, manufacturing expenses may be lowered and packaging issues may be averted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A depicts an example embodiment of an intake throttle plate with a hollow interior passage.

FIG. 2B depicts another example embodiment of the intake throttle plate from FIG. 2A with a hollow interior passage.

FIG. 4A shows a cross sectional view of the throttle plate in a closed first position.

FIG. 4B shows a cross sectional view of the throttle plate in an intermediate second position.

FIG. 4C shows a cross sectional view of the throttle plate in an intermediate third position.

FIG. 4D shows a cross sectional view of the throttle plate in an open fourth position.

DETAILED DESCRIPTION

Figure 1:
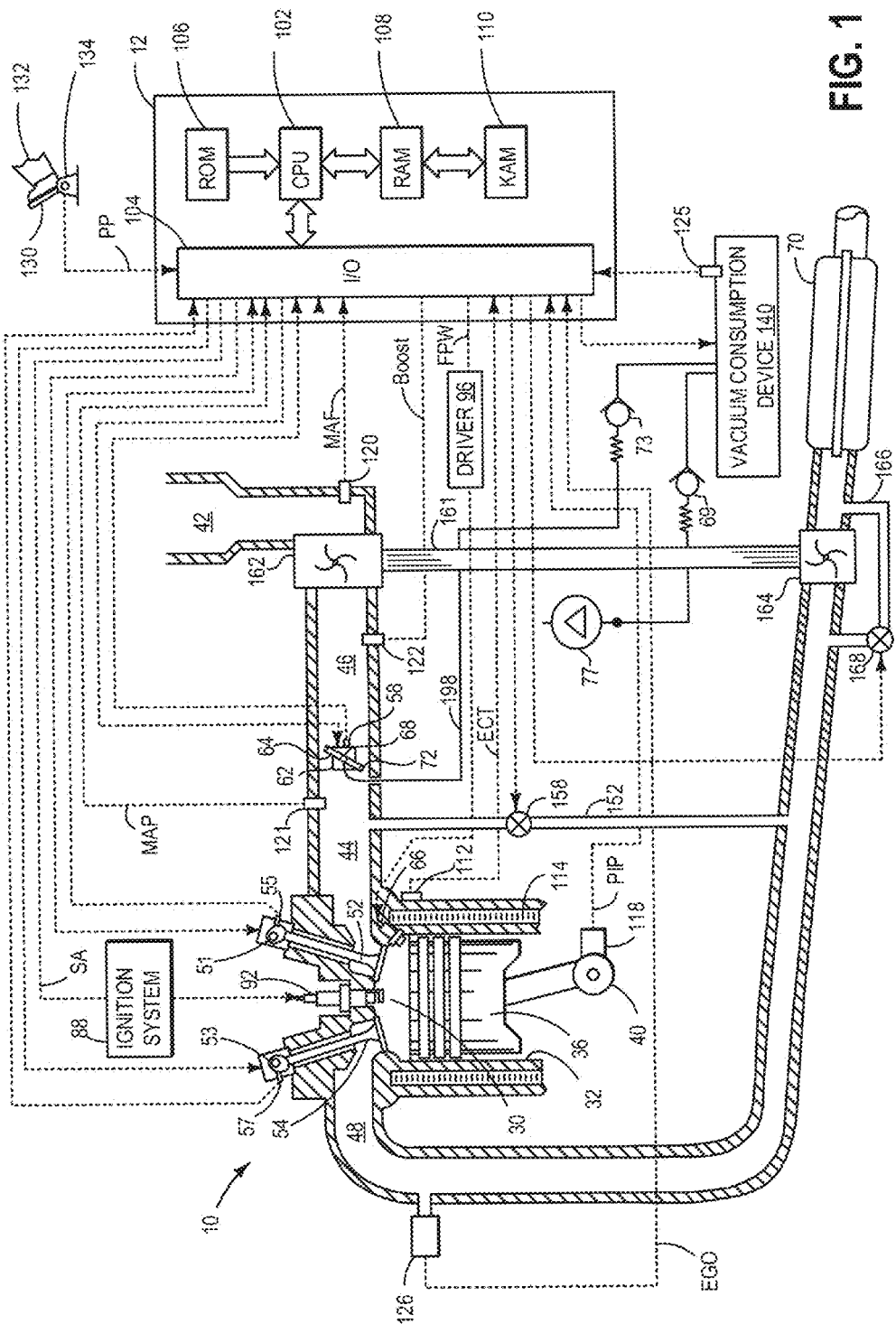
FIG. 1 portrays a schematic diagram of an engine in accordance with the present disclosure.
Figure 7:
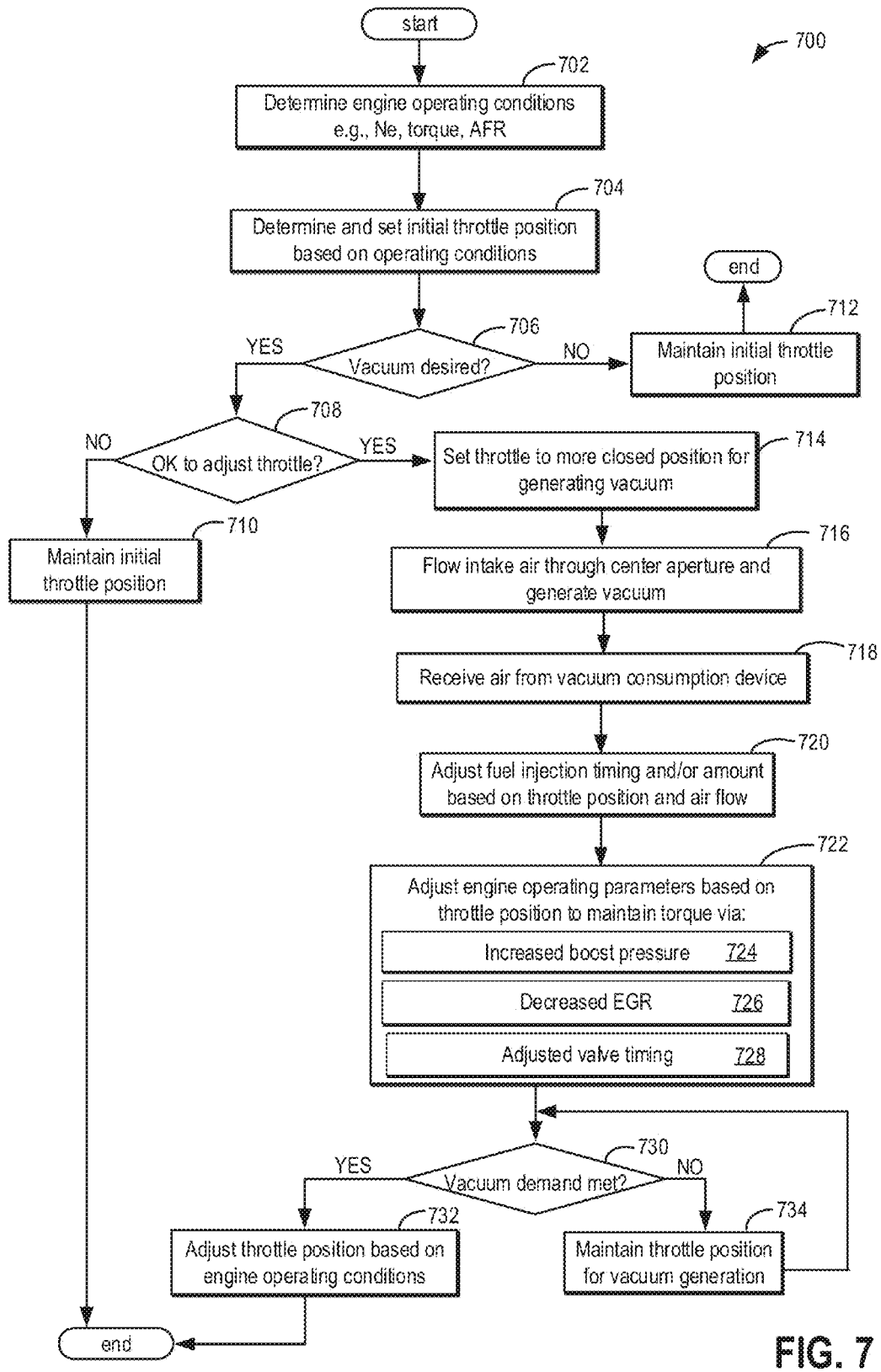
FIG. 7 is a flowchart illustrating an example method for adjusting throttle position and engine operating parameters.
Figure 8:
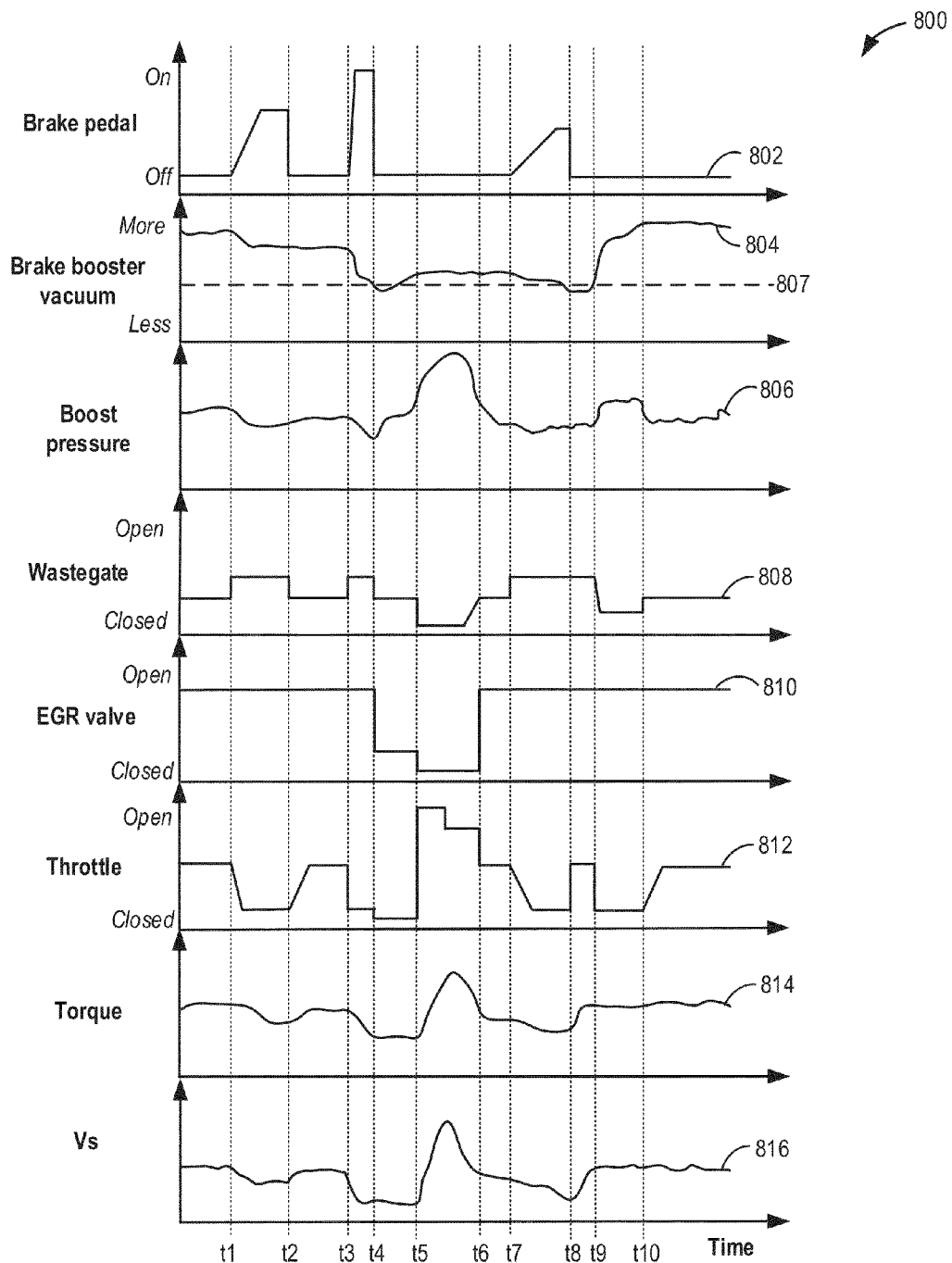
FIG. 8 portrays an example throttle position adjustment to improve vacuum generation with concurrent engine operating parameter adjustments to maintain engine torque, according to the present disclosure.

Methods and systems are described for generating vacuum within an intake passage in an engine, such as the engine system shown in FIG. 1. The intake passage may be provided with an intake throttle comprising a throttle plate with a hollow interior passage coupled to a vacuum consumption device via a hollow shaft, as shown in FIGS. 2-5. Specifically, the hollow interior passage may extend through the intake throttle plate from an upstream surface to a downstream surface of the throttle plate. As such, intake air may flow through the interior passage of the throttle plate en route to an intake valve of an engine cylinder. The interior passage may comprise a constricted portion. Specifically, the interior passage may narrow at the constricted portion, and therefore may a generate vacuum at the constricted portion via a venturi effect as intake air flows through the constricted portion of the interior passage, as shown in FIGS. 2-5. Vacuum generated at the constricted portion of the interior passage may be used to draw air from the vacuum consumption device. Further, the amount of vacuum generated at the constricted portion of the interior passage may depend on the amount of airflow through the passage, and therefore may be adjusted by adjusting the position of the throttle plate. A controller may be configured to perform a routine to modify a throttle position based on vacuum demand from the vacuum consumption device as shown in FIG. 7. As shown in FIG. 6, the controller may send signals to an actuator which may in turn adjust the position of the throttle plate based on signals received from the controller. Various operating parameters may be adjusted as shown in FIG. 8, as throttle position is varied, to maintain engine torque.

Referring now to FIG. 1, it shows a schematic depiction of a spark ignition internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion chamber 30 (also known as, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 96. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor 162 arranged along intake passage 42. For a turbocharger, compressor 162 may be at least partially driven by a turbine 164 (e.g., via a shaft) arranged along exhaust passage 48. Compressor 162 draws air from intake passage 42 to supply boost chamber 46. Exhaust gases spin turbine 164 which is coupled to compressor 162 via shaft 161. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

A wastegate 168 may be coupled across turbine 164 in a turbocharger. Specifically, wastegate 168 may be included in a bypass 166 coupled between an inlet and outlet of the exhaust turbine 164. By adjusting a position of wastegate 168, an amount of boost provided by the turbine may be controlled.

Intake manifold 44 is shown communicating with throttle 62 having a throttle plate 64. In this particular example, the position of throttle plate 64 may be varied by controller 12 via a signal provided to an electric motor or actuator (not shown in FIG. 1) included with throttle 62, a configuration that is commonly referred to as electronic throttle control (ETC). Throttle position may be varied by the electric motor via a shaft. As elaborated at FIG. 2-4, throttle plate 64 may include an opening 68 which fluidically couples the throttle with vacuum consumption device 140. Throttle 62 may control airflow from intake boost chamber 46 to intake manifold 44 and combustion chamber 30 among other engine cylinders. The position of throttle plate 64 may be provided to controller 12 by throttle position signal TP from throttle position sensor 58. As such, the position of the throttle plate 64 may be adjusted by the electric motor based on signals received from the controller 12. Said another way, the controller 12 may send signals to the electric motor for adjusting the position of the throttle plate 64.

Engine 10 is coupled to vacuum consumption device 140 which may include, as non-limiting examples, one of a brake booster, a fuel vapor canister, and a vacuum-actuated valve (such as a vacuum-actuated wastegate). Vacuum consumption device 140 may receive vacuum from a plurality of vacuum sources. One source may be vacuum pump 77 that may be selectively operated via a control signal from controller 12 to supply vacuum to vacuum consumption device 140. Check valve 69 allows air to flow to vacuum pump 77 from vacuum consumption device 140 and limits airflow to vacuum consumption device 140 from vacuum pump 77. Another source of vacuum may be throttle plate 64 which is positioned within boost chamber 46. Throttle plate 64 has a hollow interior passage 72. As shown in FIG. 1, an opening 68 within throttle plate 64 may be connected to vacuum consumption device 140 via a hollow shaft mounted on bearings (not shown) and coupled to a conduit 198. When throttle plate 64 is in a mostly closed or a fully closed position, vacuum may be generated at the interior passage 72 of throttle plate 64 as intake air flows through the interior passage 72. This vacuum may draw air from vacuum consumption device 140 through conduit 198, via the hollow shaft into the interior passage 72 of the throttle plate 64. This air may then flow out of throttle plate 64 via an opening formed at a downstream surface of the throttle plate 64 and the interior passage 72. Check valve 73 ensures that air flows from vacuum consumption device 140 to throttle plate 64 and thereon into intake manifold 44 and not from intake manifold 44 to vacuum consumption device 140.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof.

An exhaust gas recirculation (EGR) system may be used to route a desired portion of exhaust gas from exhaust passage 48 to intake manifold 44 through conduit 152 via EGR valve 158. Alternatively, a portion of combustion gases may be retained in the combustion chambers, as internal EGR, by controlling the timing of exhaust and intake valves.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as throttle plate 64, EGR valve 158 and the like. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by vehicle operator 132; a measurement of engine manifold pressure (MAP) from pressure sensor 121 coupled to intake manifold 44; a measurement of boost pressure from pressure sensor 122 coupled to boost chamber 46; a measurement of vacuum in vacuum consumption device 140 from pressure sensor 125; a profile ignition pickup signal (PIP) from Hall effect sensor 118 (or other type) coupled to crankshaft 40; a measurement of air mass entering the engine from mass airflow sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time.

FIGS. 2A and 2B illustrate schematic diagrams of embodiments 200 and 250 respectively, of a throttle plate, coupled to a vacuum consumption device that may be included in the intake of engine 10 of FIG. 1. As such, components previously introduced in FIG. 1 are numbered similarly in FIG. 2 and may not be reintroduced.

FIG. 2A shows a side perspective view of throttle plate 64 positioned within boost chamber 46. FIG. 2B shows the same side perspective view of throttle plate 64 shown in FIG. 2A, except that in FIG. 2B, the throttle plate 64 is illustrated as transparent, so as to expose the interior or the throttle plate 64. Thus, FIGS. 2A and 2B may be described together in the description herein.

Throttle plate 64 is shown positioned within boost chamber 46 of an intake as fresh intake air 82 flows through intake conduit 95. Specifically, intake air 82 flows through boost chamber 46 past throttle plate 64. An upstream surface 244 of throttle plate 64, may be perpendicular to the direction of flow of the intake air 82, and may face the oncoming intake air 82. A downstream surface 246 may be located on the opposite side of the throttle plate relative to the upstream surface 244, and may therefore not face incoming intake air 82. Thus, intake air 82 may flow through the boost chamber 46, and may contact the upstream surface 244 of the throttle plate 64. Intake air 82, may then flow around the throttle plate 64, past exterior edges defining a circumference of the throttle plate, past the downstream surface 246, towards the intake valve of cylinder 30.

Throttle plate 64 includes a hollow interior passage 72 which extends from the upstream surface 244 to the downstream surface 246 of the throttle plate. Said another way, the hollow interior passage 72 extends through the width of the throttle plate 64, such that intake air 82 may pass through the interior passage 72 en route to the intake valve of cylinder 30. Thus intake air 82 flowing through the boost chamber 46 towards the intake valve of the cylinder 30, may flow around the throttle plate 46, and/or through the interior passage 72. Further, the interior passage 72 is hollow so that it provides fluidic communication between upstream and downstream of the throttle plate 64, so that intake air 82 may flow therethrough. The interior passage 72 may be positioned at the center of the throttle plate 64. Thus, hollow interior passage 72, may also be referred to in the description herein as hollow central passage 72. Specifically, the interior passage 72 may be centered on a central axis 226 of the throttle plate 64. In the example of FIGS. 2A and 2B, the central axis of interior passage 72 may coincide with and be the same as central axis 226 of throttle plate 64. Said another way, the central axis 226 may be a central axis that is common with the throttle plate 64, and the interior passage 72. As such, interior passage 72 may be positioned concentrically within the throttle plate 64. In alternate embodiments, the interior passage 72 may not be positioned at the center of the throttle plate 64. As such, the central axis of the interior passage 72 may not coincide with the central axis 226 of the throttle plate 64 but may be parallel thereto.

The upstream surface 244 and downstream surface 246 of the throttle plate 64 may be flat and/or circular as shown in FIGS. 2A-2B. Since the interior passage 72 extends from the upstream surface 244 to the downstream surface 246, the interior passage 72 may form a first opening 75 on the upstream surface 244 and second opening 79 on the downstream surface 246. The shape of the openings 75 and 79 may be different depending on the shape of the interior passage 72. In the example shown in FIGS. 2A and 2B, the interior passage 72 may be shaped as a cylinder which narrows towards its middle. Thus, the interior passage 72 may be shaped as an hourglass, where the cross sectional area decreases with increasing deflection away from each of the openings 75 and 79. However, in other examples, each of the openings 75 and 79 may be rectangular, triangular, oval, or other shape. As such, the interior passage 72, may be any prismatic shape, which narrows towards the middle.

In this way, the throttle plate 64 may be shaped as a torus, with an outer diameter defining the extent of the throttle plate 64, and an inner diameter defining the interior passage 72. Further, the inner diameter may not be constant, but may be greatest at the upstream and downstream surfaces 244 and 246, respectively, and may decrease with increasing deflection away from the upstream and downstream surface 244 and 246. However, the upstream and downstream surfaces 244 and 246, respectively, may be flat as shown in FIGS. 2A-2B.

Vacuum consumption device 140 may be fluidly coupled via conduit 198 to a hollow shaft 74 (shown below in FIGS. 3, 4A, and 6), which in turn is connected to opening 68 (shown in FIG. 2A) of throttle plate 64. The hollow shaft may be mounted on bearings coupled to an inner surface of intake conduit 95. However, in other examples, conduit 198 may be directly coupled to the interior passage 72.

When vacuum consumption device 140 demands vacuum, and engine conditions permit, throttle plate 64 may be adjusted by the controller 12 to a more closed position within boost chamber 46. The amount of air flowing past the throttle plate 64 may decrease with increasing deflection of the throttle plate 64 towards a closed position. Said another way, as the throttle plate 64 is adjusted towards a more closed position, the amount of air permitted to pass around the periphery of the throttle plate 64 may decrease. However, as the throttle plate 64 is adjusted towards a more closed position, the amount of air permitted to pass through the interior passage 72 may increase. As the throttle plate 64 moves towards a more closed position, a top edge 242, and a bottom edge move more proximate inside edges of intake conduit 95. As such, the cross sectional flow area of the upstream surface 244 may increase with increasing deflection towards a more closed position. Said another way, the upstream surface 244 may contact a greater amount of intake air 82 with increasing deflection towards a more closed position. With throttle plate 64 situated in a more closed position, a constricted passage may be created between the inside edge of intake conduit 95 and the periphery of throttle plate 64. In the example of FIG. 2, constricted passages may be created between top edge 242 and the top inside of intake conduit 95, and bottom edge 232 of throttle plate and the bottom inside edge of intake conduit 95. Since the flow past the periphery of the throttle plate 64 may decrease with increasing deflection towards a more closed position, the amount of intake air 82 flowing through the interior passage 72 may increase. Further, since the opening 75 is parallel and flush with the upstream surface 244, as the throttle plate 64 is adjusted to a more closed position, the opening 75 may be in contact with a greater amount of intake air 82.

As intake air 82 flows through the interior passage 72, a venturi effect is created, and vacuum may be generated within the interior passage 72. Specifically, as shown in FIG. 2B, the interior passage 72, is widest at the upstream and downstream surfaces 244 and 246, respectively at each of the openings 75 and 79. The interior passage 72 narrows towards the middle. That is, the cross-sectional area of the interior passage 72, decreases between each of the openings 75 and 79 at the upstream and downstream surfaces 244 and 246, respectively. In examples where the conduit 198 is coupled directly to the interior passage 72, the conduit 198 may be coupled to the interior passage 72 at the most narrow point of the interior passage 72. Intake airflow velocity may reach a higher value in the constricted portion of the interior passage 72, where the interior passage 72 narrows, while local static pressure may reach a lower value producing a vacuum 84 at or near the location where the conduit 198 is coupled to the interior passage 72. When the vacuum is applied to the vacuum consumption device, air 86 is drawn from the vacuum consumption device 140 via conduit 198, and in some examples through a hollow shaft in the throttle plate 64 (e.g., hollow shaft 74 show in FIGS. 3, 4A, and 6), and then through the interior passage 72 and out of the opening 79 formed on the downstream surface 246 of the throttle plate 64, to join with intake air 82 flowing past throttle plate 64.

The conduit 198 is hollow, so that it may provide fluidic communication between the vacuum consumption device 140 and the interior passage 72. The conduit 198 may be defined by conduit walls 199. Thus, the conduit 198 is hollow within the conduit walls 199. A portion of the conduit 198 may extend into the interior of the throttle plate 64.

Figure 3:
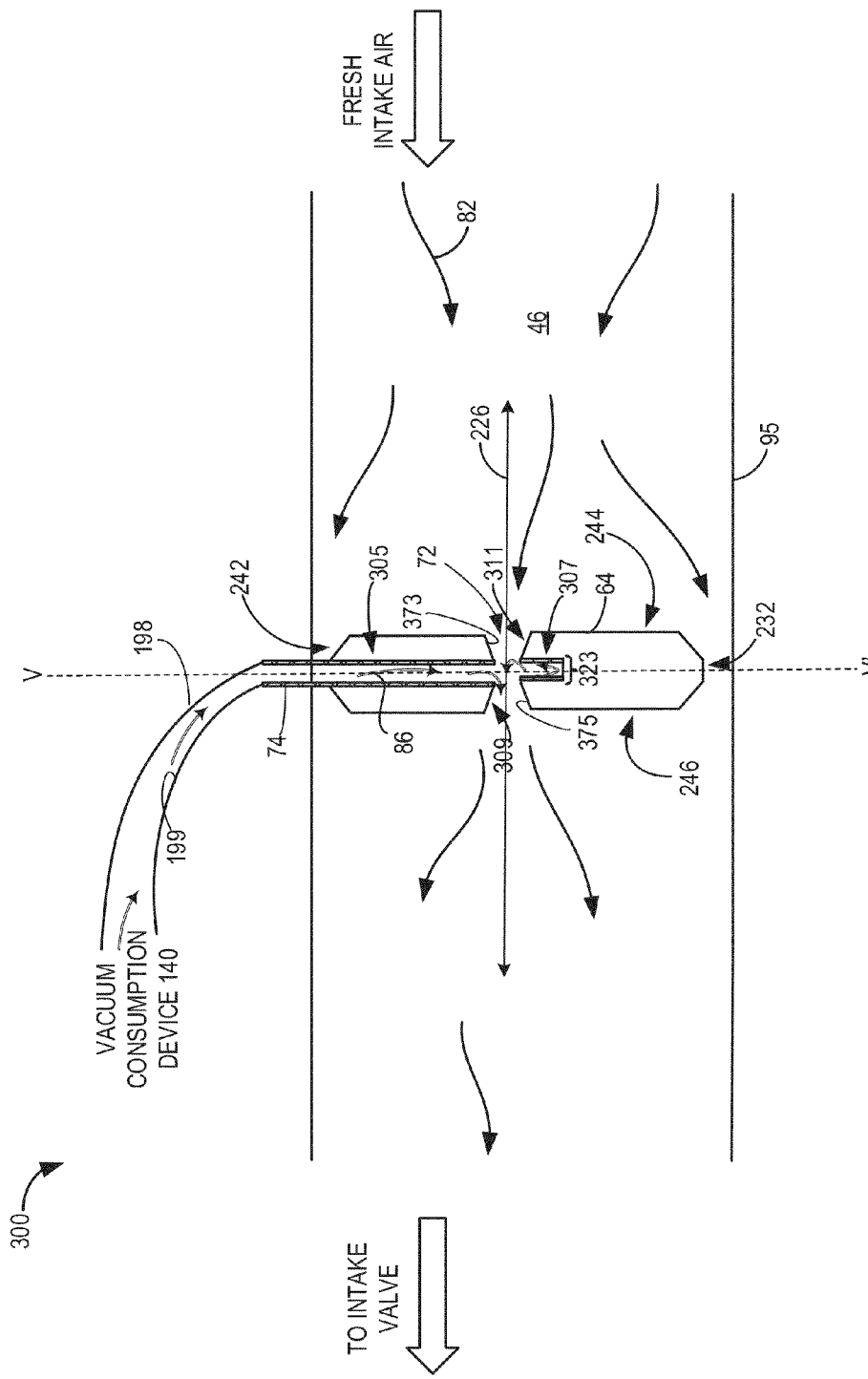
FIG. 3 shows a cross sectional view of the throttle plate of FIGS. 2A and 2B within the intake passage.

More specifically, the conduit 198, may extend through an exterior edge of the throttle plate 64 to the interior passage 72. However, in other examples as shown below with reference to FIGS. 3, 4, and 6, conduit 198 may be coupled to a hollow shaft at a location exterior to the throttle plate 64, and the hollow shaft may extend though the throttle plate to the interior passage 72. In some examples, the conduit 198 or hollow shaft may be physically coupled on a first side of the interior passage 72, and may continue to extend into the throttle plate 64 on a second side of the interior passage 72 directly opposite the first side. More specifically, air 86 from conduit 198 may flow into interior passage 72 via first aperture 175. However air 86 may also through a second aperture 176 into a portion of conduit 198 or the hollow shaft that extends further into the throttle plate 64 on the opposite side of the interior passage 72 as shown in greater detail below with reference to FIG. 3. As such, in some examples, air 86 may flow through the conduit 198, and then in some examples through the hollow shaft, into the interior passage 72 via first aperture 175, and then across the interior passage 72 through second aperture 176, and then back into interior passage 72 through second aperture 176, and out the throttle plate 64 via the opening 79 positioned on the downstream surface 246. FIG. 3 shows a more detailed illustration of the flow of air 86 through the conduit 198 into the interior passage 72.

Thus, the only portion of the throttle plate 64 that may be hollow is within the conduit walls 199 of the conduit 198 and/or within the walls of the hollow shaft, and the interior passage 72. However, in other examples, the throttle plate 64 may be entirely hollow, such that the portion of the throttle plate within and outside of the conduit walls 199 and the walls of the hollow shaft may be hollow. The conduit walls 199 or the walls of the hollow shaft (e.g., hollow shaft 74 shown in FIGS. 3, 4A, and 6) may therefore, be physically coupled to the interior passage 72 at the first aperture 175, so that air 86 flowing through the conduit 198 may only flow within the conduit walls 199, and into the interior passage 72 via aperture 175. As such, interior passage 72 and conduit 198 may be in sealing contact with one another so that air 86 flowing through conduit 198 may only flow into interior passage 72, and out of the throttle plate at the downstream surface 246 via the opening 79. Thus, no air may flow within throttle plate 64 outside of the interior passage 72 and conduit 198. Cutting plane M-M' defines the perspective view of the throttle 64 shown in FIGS. 3-4D below.

Turning now to FIG. 3, it shows an embodiment 300, where throttle plate 64 and its arrangement in the intake conduit 95 is shown in more detail. FIG. 3 is a cross sectional view of throttle plate 64 positioned within intake conduit 95, where the cross sectional plane is taken along line M-M' of FIGS. 2A-2B. Note that components previously introduced in FIG. 1 and FIGS. 2A-2B are numbered similarly in FIG. 3, and may not be reintroduced.

Throttle plate 64 is positioned in the example of FIG. 3 in a closed first position. In the closed first position, the throttle plate 64, is approximately perpendicular to the walls of the intake conduit 95. As such, the flow of intake air 82 around the throttle plate 64 may be reduced. Said another way, the opening that exists between the edges of the throttle plate and the walls of the conduit 95 may decrease with increasing deflection of the throttle plate towards the closed first position. In some examples, intake air 82 may not flow around the throttle plate 64 in-between the top edge 242 and the interior wall of the conduit 95, and in-between the bottom edge 232 and the interior wall of the conduit 95. However, in the closed first position, the interior passage 72 may be perpendicular to the flow of intake air 82, so that intake air 82 may flow through the interior passage 72, and therefore the throttle plate 64, from the upstream surface 244 of the throttle plate 64, to the downstream surface 246.

As described above with reference to FIG. 2, air 86 may be drawn from the vacuum consumption device 140 and may travel through conduit 198 towards the interior passage 72. However, in the example shown in FIG. 3, the conduit 198 may be physically and fluidly coupled to a hollow shaft 74, which may extend radially into the throttle plate 64, and may be coupled to the interior passage 72. The hollow shaft 74 may be arranged centrally within the throttle plate 64, such that it is centered on a central vertical axis V-V' of the throttle plate 64. In some examples, as shown above with reference to FIG. 2B, a first portion 305 of the hollow shaft 74 may be continuous up to the first aperture 175 (shown above with reference to FIG. 2B). However, in other examples, as shown in FIG. 3, the first portion 305 of the hollow shaft 74 may be coupled to a first side 309 of the interior passage 72 via the first aperture 175, and may extend out past the edge of the throttle plate 64, and past the walls of the intake conduit 95, to exterior of the intake conduit 95. Thus, the first portion 305 of the hollow shaft 74 may be physically and fluidly coupled on one end to the conduit 198, and on the other end to the interior passage 72, where the conduit 198 and the hollow shaft 74 may be coupled to one another exterior to the intake conduit 95. As such, the hollow shaft 74 may provide fluidic communication between the vacuum consumption device and the interior passage 72 of the throttle plate 64. The walls of the hollow shaft 74 do not extend through the interior passage 72. Thus, intake air 82 may flow through the interior passage 72 without any obstruction from the hollow shaft 74. However, the hollow shaft 74 may continue on a second side 311 of the interior passage 72, where the second side 311 is directly opposite the first side 309, and may extend further in the throttle plate 64. Thus, an extended second portion 307 of hollow shaft 74 may continue on the opposite side of the central axis 226 with respect to the first portion 305. However, in some examples, the hollow shaft 74 may only extend up to the first side 309 of the interior passage 72 at the first aperture 175, and may not extend further into the throttle plate 64.

In some examples, the only portion of the throttle plate 64 that may be hollow is within the walls of the hollow shaft 74, and the interior passage 72. However, in other examples, the throttle plate 64 may be entirely hollow, such that the portion of the throttle plate within and outside of the walls of the hollow shaft 74 may be hollow. The walls of the hollow shaft 74 may therefore, be physically coupled to the interior passage 72 at the first aperture 175 shown in FIG. 2A, so that air 86 flowing through the conduit 198 may only flow within the hollow shaft 74, and into the interior passage 72. As such, interior passage 72 and hollow shaft 74 may be in sealing contact with one another so that air 86 flowing through hollow shaft 74 may only flow into interior passage 72, and out of the throttle plate at the downstream surface 246 via the opening 79. Therefore, air 86 may flow from the vacuum consumption device 140 through the hollow shaft 74, and into the interior passage 74 via the first aperture 175 formed where the hollow shaft 74, and interior passage are coupled to one another. Thus, no air may flow within throttle plate 64 outside of the interior passage 72 and hollow shaft 74.

The interior passage 72 may comprise first inner walls 373, and second inner walls 375, positioned on opposite sides of the hollow shaft 74. The first inner walls 373 may be angled outwardly in an upstream direction away from the hollow shaft 74, while the second inner walls 375 may be angled outwardly in a downstream direction away from the hollow shaft 74. Specifically, one of the first inner walls 373 more proximate the top edge 242 may be coupled on one end to the upstream surface 244 of the throttle plate 64, and on the other end, to a portion of the hollow shaft 74 more proximate the upstream surface 244, and may be angled outwardly from the hollow shaft 74 to the upstream surface 244. The other one of the first inner walls 373 more proximate the bottom edge 232, may be coupled on one end to the upstream surface 244 of the throttle plate 64, and on the other end, to a portion of the extended portion 305 of the of the hollow shaft 74 more proximate the upstream surface 244, and may be angled outwardly from the hollow shaft 74 to the upstream surface 244. Similarly, one of the second inner walls 375 more proximate the top edge 242, may be coupled on one end to the downstream surface 246 of the throttle plate 64, and on the other end, to a portion of the hollow shaft 74 more proximate the downstream surface 246, and may be angled outwardly from the conduit wall to the downstream surface 246. Additionally, the other one of the second inner walls 375 more proximate the bottom edge 232, may be coupled on one end to the downstream surface 246 of the throttle plate 64, and on the other end, to a portion of the extended portion 305 of the hollow shaft 74 more proximate the downstream surface 246, and may be angled outwardly from the conduit wall to the downstream surface 246.

As such, the interior passage 72 may be narrower where it intersects with the hollow shaft 74, than at the upstream and downstream surfaces 244 and 246, respectively. More specifically, a constricted portion 323 of interior passage 72 may be a portion of the interior passage 72 where the interior passage 72 is most narrow. The constricted portion 323, may therefore be the portion of the interior passage 72, between each of the first inner walls 373, and each of the second inner walls 375. In the example shown in FIG. 3, the constricted portion 323 of the interior passage 72, may span the diameter of the hollow shaft 74. However, in other examples, the constricted portion 323 may wider than the diameter of the hollow shaft 74. In some examples, the cross sectional area of the interior passage 72, may be uniform in the constricted portion 323 of the interior passage. The interior passage 72 may therefore become increasingly narrow with increasing deflection towards the hollow shaft 74 and away from the upstream and downstream surfaces 244 and 246, respectively. Then, at the constricted portion 323, the interior passage 72 may be uniform in cross sectional area. Airflow through the interior passage 72 may therefore be constricted as it nears the constricted portion 323 near the center of the throttle plate 64 where the hollow shaft 74 is coupled to the interior passage 72. Thus, as air 82 flows through the interior passage 72, vacuum is generated at the constricted portion 323 via a venture effect at the constricted portion 323, which in the example shown in FIG. 3 coincides with where the hollow shaft 74 is fluidically coupled to the interior passage 72. Thus, the hollow shaft 74, may be physically and fluidically coupled to the interior passage 72 at the constricted portion 323 of the interior passage 72. Thus, the aperture 175 shown in FIG. 2B may be positioned at the constricted portion 323 of the interior passage 72. Air 86 from the vacuum consumption device 140 may be drawn through passage 198 and hollow shaft 74 into the interior passage 72 at the constricted portion 323 of the interior passage 72.

Thus, the first portion 305 of the hollow shaft 74, may be fluidly coupled on one end to the constricted portion 323 of the interior passage 72, and on the other end to the conduit 198. Specifically, the hollow shaft 74, may be coupled to a first side 309 of the constricted portion 323 of the interior passage 72, via a first aperture 175. As such, air 86 may flow from the vacuum consumption device 140 through the hollow shaft 74, and into the constricted portion 323 of the interior passage 72 via the first aperture 175 formed where the hollow shaft 74 is coupled to the constricted portion 323 of the interior passage 72.

All or a portion of the air 86 entering the interior passage 72 from conduit 198 and hollow shaft 74, may flow across the interior passage 72, into extended portion 305 of the hollow shaft 74 before exiting the throttle plate 64 through the interior passage 72. Thus, a portion of all of the air 86 may pass through the interior passage 72, into the extended portion 305, back into the interior passage 72, and then out the throttle plate 64 through the interior passage 72, downstream of the hollow shaft 74. However, in other examples, air 86 may pass directly into the interior passage 72 from hollow shaft 74 and out of the throttle 64. After exiting hollow shaft 74, and entering interior passage 72, the air 86 from the vacuum consumption device 140 may join with intake air 82 flowing through the interior passage 72 from the upstream surface 244 to the downstream surface 246. As such, a mixture of intake air 82 and air 86 from the vacuum consumption device may exit the throttle 64 at the downstream surface 246, and may continue in the conduit 95 towards the intake valve of cylinder 30 shown in FIG. 1.

In the example of FIG. 3, hollow shaft 74, is shown penetrating into the throttle plate 64 from the top edge 242, towards the center of the throttle plate 64, and connecting with the constricted portion 323 of the interior passage 72. Said another way, the hollow shaft 74, may extend radially inward from the top edge 242 of the throttle plate 64, and may be coupled to the interior passage 72, to provide fluidic communication between conduit 198 and the interior passage 72. However, in other examples, as shown below with reference to FIGS. 4A-4D, the hollow shaft 74 may extend radially inward towards the interior passage 72, from locations other than the top edge 242 around the circumference of the throttle plate 64.

Turning now to FIGS. 4A-4D they show embodiments where the hollow shaft 74 may be coupled to the throttle plate 64 along the axis of rotation of the throttle plate 64. Thus, FIGS. 4A-4D, show the relative positioning of the hollow shaft 74 and the throttle plate 64, as the throttle plate 64 is adjusted to different example positions that may occur during engine operation. Similar to FIG. 3, FIGS. 4A-4D show cross sectional views of throttle plate 64 positioned within intake conduit 95, where the cross sectional plane is taken along line M-M' of FIGS. 2A-2B. FIG. 4A, shows the throttle plate 64 in the closed first position shown above with reference to FIG. 3. FIGS. 4B and 4C, show the throttle plate 64 in intermediate second positions, where more air may flow past throttle plate 64 in the intermediate second positions than in the closed first position. FIG. 4D, shows the throttle plate 64 in an open third position, where more air may flow past the throttle plate 64 in the open third position than in the intermediate second positions. Note that components previously introduced in FIG. 1 and FIGS. 2A-2B are numbered similarly in FIG. 3, and may not be reintroduced.

FIG. 4A shows an embodiment 400, where throttle plate 64 is in the closed first position. Thus, throttle plate 64 may be approximately perpendicular to the walls of conduit 95. Throttle plate 64 may rotate about an axis of rotation R-R' shown in FIG. 4A. Thus, in FIGS. 4B-4D, throttle plate 64 may be shown rotated about the axis of rotation R-R' in different positions. A portion of conduit 198 exterior to conduit 95 is shown in dotted lines. However, as explained above with reference to FIG. 3, hollow shaft 74 may extend radially inward from a location on the circumference of throttle plate 64, to the interior passage 72. As shown in the examples of FIGS. 4A-4D, the hollow shaft 74 may extend radially between the interior passage 72, and an edge of the throttle plate 64, along the axis of rotation R-R.' Thus, the walls of the hollow shaft 74 may be parallel to the axis of rotation R-R.' As such, the hollow shaft 74 may not move, but may rotate as the throttle plate 64 rotates about the axis of rotation R-R.' However, in other examples, the hollow shaft 74 may be free to rotate relative to the throttle plate 64, and as such may remain in approximately the same position during rotation of the throttle plate 64. In such examples, the conduit 198 may be free to rotate relative to the hollow shaft 74, and as such may remain in approximately the same position during rotation of the throttle plate 64.

FIG. 4B shows an embodiment 425, where the throttle plate 64 is rotated along the axis of rotation R-R,' relative to the closed first position shown in FIG. 4A to an intermediate second position. Specifically, throttle plate 64 is rotated in FIG. 4B so that the top edge 242, moves upstream in the conduit 95, and the bottom edge 232 moves downstream in conduit 95 relative to their positioning shown in the closed first position of FIG. 4A. Put more simply, in FIG. 4B, the throttle plate 64 is shown rotated clockwise from the closed first position. However, the conduit 198 and/or hollow shaft 74 may remain in the same position in FIG. 4B, as in FIG. 4A, since they may be centered on the axis of rotation R-R' of the throttle plate 64.

FIG. 4C shows an embodiment 450, where the throttle plate 64 is rotated along the axis of rotation R-R,' relative to the closed first position shown in FIG. 4A to an intermediate third position. Specifically, throttle plate 64 is rotated in FIG. 4C so that the top edge 242, moves downstream in the conduit 95, and the bottom edge 232 moves upstream in conduit 95 relative to their positioning shown in the closed first position of FIG. 4A. Put more simply, in FIG. 4C, the throttle plate 64 is shown rotated counterclockwise from the closed first position shown in FIG. 4A. However, the conduit 198 and/or hollow shaft 74 may remain in the same position in FIG. 4C, as in FIG. 4A, since they may be centered on the axis of rotation R-R' of the throttle plate 64.

In both the intermediate second position and intermediate third position shown in FIGS. 4B and 4C respectively, the amount of intake air 82 flowing through the interior passage 72, may be approximately the same, and may be less than that in the closed first position of the throttle plate 64 shown in FIG. 4A. Said another way, more intake air 82, may flow through the interior passage 72, in the closed first position of the throttle plate 64 shown in FIG. 4A, than when the throttle plate 64 is rotated away from the closed first position as shown in FIGS. 4B and 4C. Since the amount of intake air 82 flowing through the interior passage 72 may be less when the throttle plate 64 is rotated away from the closed first position, the amount of vacuum generated at the constricted portion 323 of the interior passage 72, may be less than when the throttle plate 64 is adjusted to the closed first position. Thus, as the throttle plate 64 is adjusted towards the closed first position where the throttle plate 64 is approximately perpendicular to the walls of the conduit 95, the amount of air flowing through the interior passage 72 may increase, and in turn the amount of vacuum generated due to the venturi effect at the constricted portion 323 of the interior passage 72 may increase. In this way, the amount of air 86 flowing from the vacuum consumption device 140, to the interior passage 72 may increase with increasing deflection of the throttle plate 64 towards the closed first position, where the throttle plate 64 is approximately perpendicular to the walls of the conduit 95.

FIG. 4D shows an embodiment 475, where the throttle plate 64 is rotated along the axis of rotation R-R,' relative to the closed first position shown in FIG. 4A to an open fourth position. Specifically, in the open fourth position, the throttle plate 64 is rotated in FIG. 4C so that the throttle plate 64 is parallel to the walls of the conduit 95. However, the hollow shaft 74 and/or conduit 198 may remain in the same position in FIG. 4D, as in FIG. 4A, since they may be centered on the axis of rotation R-R' of the throttle plate 64. Intake air 82 may flow completely around the throttle plate 64, since the throttle plate 64 is parallel to the conduit 95. As such, less air may flow through the interior passage 72 when the throttle plate is in the open fourth position, than in the intermediate second and third positions shown in FIGS. 4B and 4C, respectively.

Figure 5:
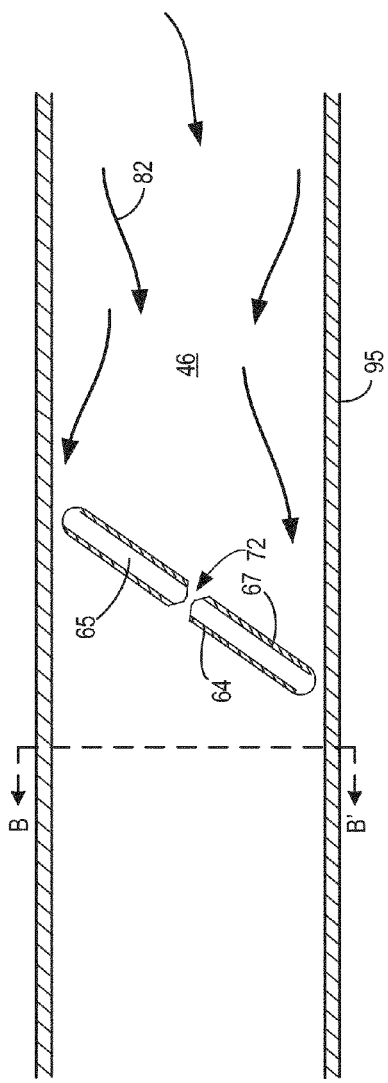
FIG. 5 shows a schematic illustration of the throttle plate within the intake passage.
Figure 6:
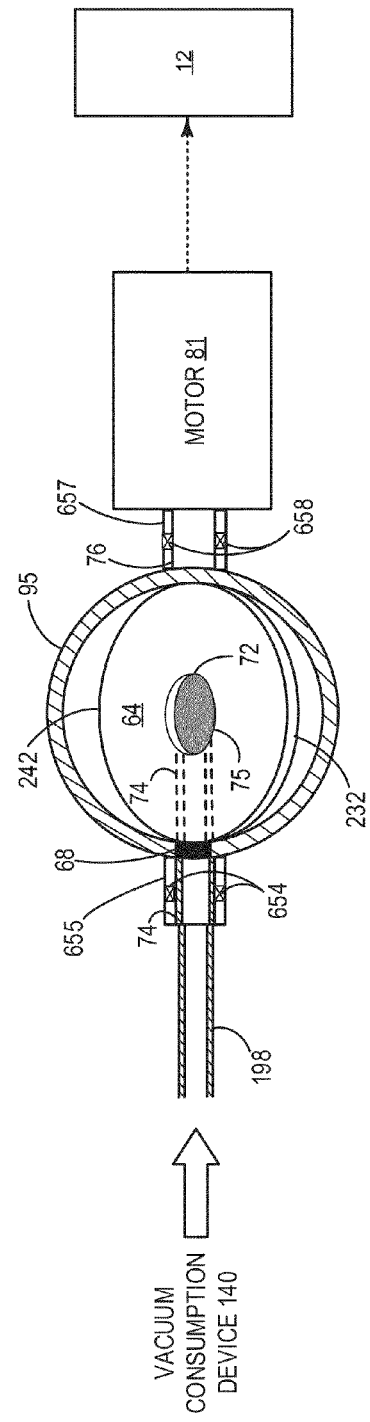
FIG. 6 shows a cross-section of the intake passage of FIG. 5 to depict an alternate view of the throttle plate.

Turning now to FIGS. 5 and 6, they show throttle plate 64 and its arrangement in the intake conduit 95 in more detail. FIG. 5 is a schematic diagram of boost chamber 46 with throttle plate 64 positioned within and viewed from the side of intake conduit 95. FIG. 6 is a cross sectional view of boost chamber 46 within intake conduit 95, in a cross sectional plane along line B-B' of FIG. 3. In the depicted example, throttle plate 64 is situated within intake conduit 95 and leaning away from the viewer such that bottom edge 232 is lifted towards the viewer. Note that components previously introduced in FIG. 1 and FIG. 2 are numbered similarly in FIGS. 3 and 4, and not reintroduced.

Throttle plate 64 is positioned in the examples of FIG. 5 and FIG. 6 in a more closed position within intake conduit 95 and boost chamber 46 than the open third position shown above with reference to FIG. 4D. The depicted more closed position enables more vacuum generation than would be obtained in the open third position. A region 65 is enclosed within walls 67 of throttle plate 64. In some examples, region 65 may be hollow. However, in other examples region 65 may not be hollow. FIG. 6 depicts the placement of interior passage 72 within throttle plate 64. Specifically, the interior passage 72 may be centered on the center of the throttle plate 64. As shown in FIG. 6, the interior passage 72 may be cylindrical, and as such the first opening 75 may be circular. However, the size, and location of the interior passage 72 may be different from the example shown herein. Vacuum consumption device 140 is connected via conduit 198, and hollow shaft 74 to opening 68 of throttle plate 64. Hollow shaft 74 may be fluidly coupled to conduit 198 in a longitudinal manner. Hollow shaft 74 may extend radially inward from the opening 68 towards the interior passage 72, as shown by the dotted lines in FIG. 6, and may be fluidly coupled to the interior passage 72. As such, vacuum consumption device 140 may be in fluidic communication with interior passage 72 via conduit 198 and hollow shaft 74.

A position of throttle plate 64 may be adjusted by motor 81 that is connected to throttle plate 64 via shaft 76. Shaft 76 may not be hollow. Throttle plate 64 may be mounted on hollow shaft 74 and shaft 76 such that shafts 74 and 76 are perpendicular to the edge of the throttle plate. Further, throttle plate 64 may be joined to shaft 76 and hollow shaft 74 at its edge via one or more of various joining methods including welding, adhesion and fastening. Other joining methods not listed herein may also be used. Throttle plate 64 may in turn be fitted within a throttle body (not shown). Each of the shafts 74 and 76, may be mounted on respective bearings 654 and 658 which may be bolted to their respective housings 655 and 657. Thus, as throttle plate 64 is rotated to different throttle angles within intake conduit 95, shaft 74 and 76 may spin, supported by respective bearings 254 and 258. Motor 81 may be powered by a system battery and may receive operating commands from controller 12 to adjust the position of throttle plate 64 via shaft 76 based on engine conditions. By varying a position of shaft 76, motor 81 may adjust an opening and closing of throttle plate 64.

Thus, in one example, throttle plate 64 may be adjusted by motor 81 to a more closed position in response to an increase in vacuum demand at the vacuum consumption device 140. As intake air 82 flows through interior passage 72 of throttle plate 64, vacuum may be generated herein. This vacuum may be applied to vacuum consumption device 140 by flowing air from vacuum consumption device 140 through conduit 198 and hollow shaft 74, into interior passage 72. Air drawn from vacuum consumption device 140 may then be streamed through interior passage 72 along with intake airflow, e.g. intake air 82, towards the intake valve of cylinder 30.

In this way, a system may comprise an engine including an intake conduit, a throttle plate mounted on a hollow shaft positioned in the intake conduit, the throttle plate having a hollow interior passage extending from an upstream surface to a downstream surface of the throttle plate, for flowing intake air through the throttle plate, and a controller with computer-readable instructions stored in non-transitory memory. The computer-readable instructions may include instructions for in response to vacuum demand, adjusting a position of the throttle plate to generate vacuum at a constricted portion of the interior passage as intake air flows through the interior passage. In some examples, the system may further comprise a vacuum consumption device, wherein the hollow shaft of the throttle plate is fluidly coupled to the vacuum consumption device and the constricted portion of the interior passage, where the hollow shaft extends radially outward from the constricted portion of the interior passage through the throttle plate, and through the intake conduit along an axis of rotation of the throttle plate, and wherein the controller includes further instructions for applying the generated vacuum to the vacuum consumption device. The adjusting of the throttle plate may be in response to the vacuum demand of the vacuum consumption device, where the controller may be configured to move the throttle plate towards a more closed position where the intake airflow through the interior passage may increase to increase vacuum generation at the throttle plate as the vacuum demand of the vacuum consumption device increases. In some examples, the interior passage is narrowest at the constricted portion, whereby a venturi effect may be created at the constricted portion of the interior passage. Further, the hollow shaft may in some examples comprise a first portion that extends radially inward from exterior the throttle plate and may fluidly coupled to a first side of the constricted portion of the interior passage via a first opening, and a second portion that may be fluidly coupled to a second side of the constricted portion of the interior passage via a second opening, the second side directly opposite the first side, and where the second portion may extend from the second side radially outward into the throttle plate so that a portion of gasses in the interior passage may flow into the second portion and back into the interior passage.

Turning now to FIG. 7, it shows an example routine 700 that a controller (e.g., controller 12 shown in FIG. 1) may perform to adjust a throttle plate (e.g., throttle plate 64 shown in FIGS. 1-6) position in response to vacuum demand from a vacuum consumption device coupled to the throttle plate. In the description herein, the term "throttle" may also be used to refer to "throttle plate." Additionally, the controller may modify one or more engine operating parameters responsive to the adjusting of the throttle plate in order to maintain engine torque.

At 702, engine operating conditions may be determined. Engine operating conditions may include engine speed, torque demand, combustion air-fuel ratio, boost pressure, manifold absolute pressure, mass airflow, engine temperature, etc. Once engine operating conditions are estimated, at 704, an initial throttle position may be determined and set based on these engine operating conditions. For example, as the operator torque demand increases, the throttle may be moved to a more open position to increase intake airflow. As another example, if combustion air-fuel ratio is determined to be leaner than a desired stoichiometric value, the throttle may be set to a more closed position to reduce intake airflow. In yet another example, if engine idling conditions are met, the throttle may be moved to a fully closed position.

At 706, routine 700 may determine if vacuum is desired by a vacuum consumption device (e.g., vacuum consumption device 140 shown in FIG. 1) coupled to the throttle. In one example, vacuum may be demanded when the vacuum consumption device is actuated. In another example, if the vacuum consumption device includes a vacuum reservoir, it may be determined if the vacuum requirement of the device exceeds the vacuum available in the reservoir. If it is determined that vacuum is not desired, at 712, the initial throttle position may be maintained and the routine ends. The throttle position may then continue to be adjusted based on engine operating conditions only, and not based on vacuum requirement of the vacuum consumption device.

On the other hand, if it is determined that the vacuum consumption device requires vacuum assistance, at 708, routine 700 may assess whether engine conditions allow a change in throttle position. In particular, it may be determined if the engine conditions permit a change in the throttle position towards a more closed position where intake airflow to the engine is reduced. As such, there may be engine conditions where changes in throttle position may be tolerated without affecting engine performance. In addition, there may be conditions where the throttle position is limited or constrained. For example, if the vehicle is accelerating on a highway and engine speed is higher than a threshold, the throttle may be positioned in a mostly open or fully open position to allow higher airflow than when the throttle is in a more closed position. In this situation, the throttle position may not be moved to a more closed position for generating vacuum as it would adversely affect engine torque output and performance. Thus, if it determined that the position of the throttle cannot be adjusted, at 710, the controller maintains the throttle at its initial position and the routine ends. The throttle position may then continue to be adjusted based on engine operating conditions only, and not based on the vacuum requirement of the vacuum consumption device.

However, if it is assessed that engine conditions permit a change in throttle position, and more specifically the conditions permit a decrease in throttle position, at 714, the throttle may be moved towards a more closed position than the initial position. The adjustment to the position of the throttle may depend on the level of vacuum desired by the vacuum consumption device. For example, if a higher level of vacuum is desired, the throttle may be moved further towards a fully closed position (e.g., the throttle may be fully closed). On the other hand, if a lower level of vacuum is desired, the controller may adjust the throttle to a slightly closed or partially closed position. Thus, as the level of desired vacuum from the vacuum consumption device increases, the throttle may be moved towards a more closed position. In one example, if it is determined at 708 that the throttle is already in a closed position during engine idling, the throttle position may be retained, at 714, without further adjustments.

Next, at 716, vacuum may be generated at the throttle plate as intake air flows through a interior passage (e.g., interior passage 72 shown in FIGS. 1-6) of the throttle. Thus, the method 700 at 716 may include flowing intake air through the interior passage. As elaborated previously, a venturi effect may be created by the flow of intake air through a constricted passage (e.g., constricted portion 323 shown in FIGS. 3-4D) of the interior passage. Specifically, the interior passage may be shaped such that it is narrower towards the middle than at either end. In this way, a venture effect may be created at the constricted portion of the interior passage, and vacuum may be generated within the constricted portion of the interior passage. At 718, the generated vacuum may be applied to the vacuum consumption device to enable the device to be actuated or operated. For example, where the vacuum consumption device is a brake booster, the generated vacuum may be applied to enable wheel braking. As another example, where the vacuum consumption device is a fuel vapor canister, the generated vacuum may be applied to enable canister purging to the engine intake. As yet another example, where the vacuum consumption device is a vacuum actuated valve, the generated vacuum may be applied to enable valve actuation. As vacuum is applied to the vacuum consumption device, air is received from the vacuum consumption device at the throttle plate. As described earlier, air may flow from the vacuum consumption device, through a conduit (e.g., conduit 198 shown in FIGS. 1-6) coupled to a hollow shaft (e.g., hollow shaft 74 shown in FIGS. 3-6) of the throttle plate and out through the interior passage into the intake. Thus, the air from the vacuum consumption device is received at the throttle, facilitating air flow control.

At 720, one or both of fuel injection amount and injection timing may be adjusted based on the throttle position, and existing airflow, to maintain engine torque. Existing airflow may be a combination of fresh intake air that flows past the perforated edge of the throttle and air flowing from the vacuum consumption device through the throttle plate into the intake. In one example, the fuel injection amount and/or timing may be adjusted to maintain a cylinder air-fuel ratio at or close to a desired ratio, such as stoichiometry. In another example, fuel injection amount and/or timing may be modified to maintain engine combustion for torque. In yet another example, one or both of fuel injection timing and fuel injection amount may be varied to maintain each of engine torque and a stoichiometric air fuel ratio.

In one example, during engine idling conditions, as the throttle is adjusted to a fully closed position, airflow via the throttle is reduced while airflow from the vacuum consumption device into the intake manifold is increased. Based on the total airflow being smaller, a fuel injection amount may be decreased to maintain air-fuel ratio. The fuel injection amount may be reduced by decreasing a pulse width of the fuel injection. Further, fuel injection timing may be advanced or retarded based on engine torque requirement.

At 722, one or more engine operating parameters may be varied in response to the adjustment of throttle position and the flowing of air from the vacuum consumption device. Engine operating parameters may be modified to maintain engine torque output. For example, boost pressure may be increased at 724 as the throttle plate is moved to a more closed position at 714. To increase boost pressure, a wastegate coupled across an exhaust turbine may be adjusted to a less open position to allow a larger quantity of exhaust gases to flow past the exhaust turbine. By increasing boost pressure in the boost chamber within the intake, a drop in engine torque resulting from the throttle closing can be compensated for.

Engine torque output may also be maintained by decreasing a rate of exhaust gas recirculation (EGR) at 726. As the throttle is moved to a more closed position, an EGR valve in an EGR passage coupling the engine exhaust to the engine intake may be adjusted to a more closed position to allow a smaller proportion of exhaust gases to be recirculated into the intake. Thus, by reducing the flow of exhaust residuals into the intake, engine dilution is reduced, and the aircharge within engine cylinders may comprise a larger proportion of fresh intake air allowing the engine to maintain its torque output.

At 728, valve timing may be adjusted to retain engine torque levels. In one example, the intake valve may be held open for a longer duration to allow more fresh air into the cylinder. In another example, exhaust valve timing may be modified to reduce the proportion of internal EGR within the cylinder. Further still, each of intake an exhaust valve timing may be adjusted to vary an amount of valve overlap. For example, valve overlap may be reduced to improve engine torque output.

It will be appreciated that the controller may select one or more of the various engine operating parameters described above to maintain torque based on existing operating conditions. For example, during a first condition, where the vehicle is operating under steady state driving conditions when the throttle position is modified to generate vacuum, the controller may only increase boost pressure but not reduce EGR to maintain engine torque output. During a second condition, as the throttle is closed, boost pressure may be maintained while EGR dilution is reduced. In another example, during a third condition, each of internal and external EGR reduction may be used. For example, an exhaust valve may be closed relatively early to reduce internal EGR within the cylinder and an opening of the EGR valve for external EGR may be decreased simultaneously to reduce external EGR into the intake. During a fourth condition, as the throttle position is closed, the controller may reduce EGR while also increasing boost pressure. Still other combinations may be possible.

Next at 730, routine 700 may confirm that sufficient vacuum has been generated to meet the demand of the vacuum consumption device. If it is determined that the demand has not been met, at 734, the throttle position set at 714 may be maintained and vacuum may continue to be generated for a longer duration. In another example, if the throttle is not fully closed at 714, the throttle may be moved to a fully closed position to generate more vacuum, if engine operating conditions allow this adjustment. Routine 700 may then return to 730 to determine if vacuum demand has been met.

If it is determined that sufficient vacuum has been generated for the vacuum consumption device, at 732, the throttle may be adjusted back to its initial position. Alternatively, the throttle may be moved to a position based only on the existing engine operating conditions.

In this way, a position of the throttle may be adjusted by the controller in response to a vacuum demand from the vacuum consumption device. As the demand for vacuum from the vacuum consumption device increases, the throttle may be moved to a more closed position. Further, changes in engine torque that occur from the decrease in throttle opening and the flowing of air from the vacuum consumption device may be counteracted by varying one or more of engine operating parameters such as boost pressure, valve timing and EGR. Thus, boost pressure may be increased, EGR flow may be reduced and valve timings may be altered to maintain engine torque output. Further, one or both of fuel injection amount and injection timing may be modified to maintain engine combustion at or around stoichiometry.

In this way, a method for an engine may comprise adjusting a position of a throttle plate with a hollow central passage, and generating vacuum at a constricted portion of the central passage, via intake airflow through the central passage of the throttle plate. The method may further comprise applying the generated vacuum to a vacuum consumption device fluidly coupled to the constricted portion of the central passage via a hollow shaft, the vacuum consumption device including a brake booster. Additionally or alternatively, the method may comprise, during the applying of generated vacuum, flowing air from the vacuum consumption device through the hollow central passage of the throttle plate into the intake airflow through the central passage. In some examples, the adjusting of the throttle plate may be based on a vacuum demand of the vacuum consumption device, the adjusting including moving the throttle plate towards a more closed position as the vacuum demand of the vacuum consumption device increases. Additionally, the method may comprise adjusting an engine operating parameter responsive to one or more of the adjusting the position of the throttle plate and the flowing air from the vacuum consumption device to maintain engine torque output. The operating parameter may include boost pressure, and thus the method may include increasing boost pressure as the throttle plate is moved towards the more closed position. Increasing boost pressure may comprise reducing an opening of a wastegate coupled across an exhaust turbine. In other examples, the operating parameter may include exhaust gas recirculation (EGR), and as such the method may include decreasing a rate of EGR as the throttle plate is moved towards the more closed position. In still further examples, the operating parameter may comprise intake valve timing. As such, the method may include increasing a duration of intake valve opening as the throttle plate is moved towards a more closed position. Additionally or alternatively, the method may further comprise, adjusting one or more of a fuel injection amount and fuel injection timing based on each of the intake airflow through the central passage and the air flowing from the vacuum consumption device through the constricted portion of the central passage into the intake airflow through the central passage to maintain engine combustion at or around stoichiometry.

Turning now to FIG. 8, it illustrates map 800 depicting an example intake throttle position adjustment based on a demand for vacuum from a brake booster and modifications in engine operating parameters in response to the throttle position adjustment. Map 800 shows brake pedal position at plot 802, brake booster vacuum level at plot 804, boost pressure at plot 806, a wastegate position at 808, EGR valve position at plot 810, throttle position at plot 812, engine torque output at plot 814, and vehicle speed, Vs, at plot 814. All the above are plotted against time on the X-axis. Line 807 represents a minimum threshold vacuum in the brake booster reservoir.

Prior to time t1, a vehicle may be moving in a steady state condition with moderate speed. The throttle may be at a partly open position to allow adequate airflow into the intake, the throttle opening based on the operating conditions such as the vehicle speed and the operator demanded torque. Further, engine torque output and boost pressure may be adjusted to moderate levels based on the operating conditions. In the depicted example, the engine is operating with the wastegate at a mostly closed position to provide the demanded boost pressure. Brake pedal is in a released (or "off") position and vacuum in the brake booster reservoir is sufficient, as indicated by the brake booster vacuum being higher than vacuum threshold 807. In addition, prior to t1, based on engine operating conditions such as engine speed and load conditions, the EGR valve may be held in a more open position to permit a higher flow of exhaust residuals into the intake, to improve engine fuel economy and reduce NOx emissions.

At t1, the brake pedal may be applied by the operator upon which vacuum in the brake booster reservoir is consumed to enable wheel braking. As brake application continues, the quantity of vacuum in the reservoir reduces. However, the level of vacuum within the reservoir remains above threshold 807. Due to brake application, engine torque output and vehicle speed decrease. In addition, to reduce the engine torque output and vehicle speed, the throttle may be adjusted to a more closed position. The wastegate may also be moved to a more open position to enable boost pressure to be reduced.

At t2, the brake pedal is released and the vehicle resumes steady state travel conditions similar to those prior to t1. Based on the prevalent operating conditions, the throttle is moved towards a more open position to increase engine torque output. In addition, boost pressure is increased by moving the wastegate to a more closed position. As a result, vehicle speed may increase.

At t3, the brake pedal may be applied again. Brake pedal application at t3 may be more forceful (e.g., depressed further and faster) as compared to the brake pedal application at t1. As a result, a steeper drop in vacuum levels within the brake booster reservoir is observed. In particular, the harder brake pedal application at t3 may result in vacuum depletion to below threshold level 607 at the reservoir. As the brakes are applied, between t3 and t4, vehicle speed and engine torque output fall sharply. The throttle may be moved to a more closed position and the wastegate may be moved to a more open position, to reduce boost pressure and engine output. Serendipitously, the throttle closing also enables vacuum to be produced at the throttle, which may be applied to the brake booster during the brake application. In particular, as the throttle is moved to the more closed (e.g., fully closed) position, air flowing past the constriction between the throttle and the intake passage results in a venturi effect and vacuum is generated at the perforated edge of the throttle plate.

At t4, the brake booster vacuum level falls below threshold 807. In response to drop, a demand for additional vacuum may be received by the controller. The brakes may be released at t4 and the vehicle may travel at a slower speed between t4 and t5. However, due to the vacuum demand, the throttle may be adjusted to a fully closed position and may be maintained at the closed position to generate vacuum via intake airflow past the perforated edge of the throttle plate. The generated vacuum is applied to the brake booster until vacuum in the brake booster reservoir is above threshold 807. In an alternate example, the controller may maintain the throttle at the more closed position existing before t4 until the vacuum level in the reservoir is above the threshold. Between t4 and t5, the vacuum level in the reservoir may rise towards threshold 807, and the throttle may be moved to a nominal open position based on existing engine operating conditions. While the throttle is held closed for vacuum generation, the wastegate may be moved to a more closed position to increase boost pressure and prevent a decrease in engine torque output. Additionally, the EGR valve may be adjusted to a more closed position to reduce the flow of exhaust gas residuals into the intake and assist in maintaining engine torque.

At t5, while vacuum is being generated at the throttle, the operator may apply an accelerator pedal to sharply increase vehicle speed. For example, the operator may be accelerating on a highway to pass other vehicles and may fully depress the accelerator pedal. In response to accelerator pedal application (not shown), the throttle may be moved to a fully open position, also termed a wide open throttle position, to allow maximum airflow into the intake and into the cylinders. Thus, in response to an elevated torque request being received while the throttle was held at the more closed position for vacuum generation, the throttle may be opened and further vacuum generation may be aborted until engine conditions permit reclosing of the throttle. Due to throttle opening, vacuum levels within the brake booster reservoir remain at or around threshold 807 beyond t5. The EGR valve may be fully closed during wide open throttle conditions to reduce engine dilution and improve engine torque output. Simultaneously, the wastegate may also be moved to a fully closed position so that boost pressure can be increased rapidly, enabling a significant increase in engine torque. Between t5 and t6, the vehicle speed may rise sharply in response to the accelerator pedal application, and then as the accelerator pedal is gradually released, the vehicle speed may fall at or around t6. Engine torque and boost pressure may follow a similar path and the throttle may be moved from a fully open position to a partly open position at t6 based on existing operating conditions. Between t6 and t7, the vehicle may travel at steady state conditions wherein the vehicle speed, torque, and boost pressure return to levels prior to t1. Further, the EGR valve and the wastegate are returned to nominal positions where EGR valve is more open and the wastegate is more closed.

At t7, the brake pedal may be applied with less force than brake pedal application at t1 or t3. Thus, vacuum in the brake booster reservoir may be consumed to a lesser extent. However, since the vacuum levels within the reservoir are just at or around threshold 807, the application of brakes at t7 results in vacuum levels decreasing below threshold 807 between t7 and t8. As the brakes are applied, vehicle speed and engine torque reduce and the throttle may be moved to a more closed position. In addition, the throttle may be held at the more closed position so that vacuum can be generated for brake application. The EGR valve stays in its mostly open position while boost pressure may decrease slightly as the wastegate is opened slightly.

At t8, the brake pedal may be released and the throttle may be moved to a partly open position. Thus between t8 and t9, engine torque may rise and vehicle speed may increase. At t9, since steady state driving conditions may exist, and the vacuum levels are below threshold 807, the controller may move the throttle to a mostly closed position to generate vacuum. Between t9 and t10, therefore, vacuum levels within the brake booster reservoir increase steadily until adequate vacuum levels are achieved at t10. To prevent a reduction in engine torque between t9 and t10 as the throttle is moved to a more closed position, boost pressure may be increased by moving the wastegate to a more closed position at t9. The controller may decide to use boost pressure alone and not reduce EGR levels for maintaining engine torque output. Therefore, the EGR valve is retained at a mostly open position.

At t10, vacuum demand is met and the throttle may be returned to a partly open position. Simultaneously, the wastegate may be moved to a more open position and boost pressure may reduce to a level similar to that prior to t1.

In this way, a throttle plate configured with an interior passage which extends through the plate may be positioned in an engine intake passage to generate vacuum from intake airflow when adjusted to a more closed position. The throttle plate may be mounted on a hollow shaft that connects the throttle plate to a vacuum consumption device. In response to vacuum demand from the vacuum consumption device, the position of the throttle plate may be adjusted to a more closed position to increase vacuum generation as the demand for vacuum increases. As the opening of the throttle plate within the engine intake is decreased, engine torque output may be sustained by modifying one or more of boost pressure, EGR flow and valve timing.

In another representation, a method for an engine may comprise connecting a vacuum consumption device via a hollow shaft to a throttle plate positioned in an engine intake passage, the throttle plate having a hollow interior passage; and decreasing an opening of the throttle plate when the vacuum consumption device demands vacuum to increase vacuum production at a constricted portion of the hollow interior passage. The vacuum consumption device may be one of a brake booster, a fuel vapor canister, and a vacuum actuated valve. In some examples, the method may further comprise increasing boost pressure responsive to the decreasing to maintain an engine torque output, where the boost pressure may be increased by increasing a closing of a wastegate coupled across an exhaust turbine via an electronic controller. In further examples, the method may comprise reducing a flow of exhaust residuals from an engine exhaust to the intake passage in response to decreasing the opening of the throttle plate to maintain an engine torque output. Additionally or alternatively, the method may comprise adjusting one or more of a fuel injection amount and a fuel injection timing responsive to the decreasing to maintain engine combustion at stoichiometry.

In another representation, a method for an engine may comprise adjusting a position of a throttle plate with a interior passage to generate a vacuum within the throttle plate positioned inside an intake of the engine and a gas from outside the engine may be drawn through the interior passage via the vacuum and into intake airflow flowing through the interior passage.

In this way, the functions of an aspirator may be combined with those of a throttle, enabling a reduction in packaging space. Additionally, by removing the need for a separate aspirator, expenses may be reduced. Total airflow rate into the intake manifold at engine idle and low load conditions may be controlled in a simpler manner by adjusting the position of the throttle plate such that the amount of air flowing through a interior passage of the throttle plate may be controlled, to regulate an amount of vacuum generated at a constricted portion of the interior passage. Thus, an extra aspirator shut off valve to control aspirator flow rate into the intake may be avoided enabling a further savings in costs. Further a technical effect of increasing an amount of vacuum generated at a throttle plate, and therefore an amount of air drawn from a vacuum consumptions device coupled to the throttle plate may be increased by including a hollow interior passage in the throttle plate. The shape, size, and position of the interior passage in the throttle plate may be adjusted without changing any other component of the throttle plate or engine intake. As such, the size and shape of the interior passage may be adjusted to increase the amount of vacuum generated by the interior passage.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
adjusting a position of a throttle plate with a hollow central passage; and
generating vacuum at a constricted portion of the central passage, via intake airflow through the central passage of the throttle plate.

2. The method of claim 1, further comprising, applying the generated vacuum to a vacuum consumption device fluidly coupled to the constricted portion of the central passage via a hollow shaft, the vacuum consumption device including a brake booster.

3. The method of claim 2, further comprising, during the applying of generated vacuum, flowing air from the vacuum consumption device through the hollow central passage of the throttle plate into the intake airflow through the central passage.

4. The method of claim 3, wherein the adjusting is based on a vacuum demand of the vacuum consumption device, the adjusting including moving the throttle plate towards a more closed position as the vacuum demand of the vacuum consumption device increases.

5. The method of claim 4, further comprising adjusting an engine operating parameter responsive to one or more of the adjusting the position of the throttle plate and the flowing air from the vacuum consumption device to maintain engine torque output.

6. The method of claim 5, wherein the operating parameter includes boost pressure, and wherein the adjusting includes increasing boost pressure as the throttle plate is moved towards the more closed position.

7. The method of claim 6, wherein increasing boost pressure includes reducing an opening of a wastegate coupled across an exhaust turbine.

8. The method of claim 5, wherein the operating parameter includes exhaust gas recirculation (EGR), and wherein the adjusting includes decreasing a rate of EGR as the throttle plate is moved towards the more closed position.

9. The method of claim 5, wherein the operating parameter comprises intake valve timing, and wherein the adjusting includes increasing a duration of intake valve opening as the throttle plate is moved towards a more closed position.

10. The method of claim 3, further comprising, adjusting one or more of a fuel injection amount and fuel injection timing based on each of the intake airflow through the central passage and the air flowing from the vacuum consumption device through the constricted portion of the central passage into the intake airflow through the central passage to maintain engine combustion at or around stoichiometry.

11. A system comprising:
an engine including an intake conduit;
a throttle plate mounted on a hollow shaft positioned in the intake conduit, the throttle plate having a hollow interior passage extending from an upstream surface to a downstream surface of the throttle plate, for flowing intake air through the throttle plate; and
a controller with computer-readable instructions stored in non-transitory memory for:
in response to vacuum demand, adjusting a position of the throttle plate to generate vacuum at a constricted portion of the interior passage as intake air flows through the interior passage.

12. The system of claim 11, further comprising a vacuum consumption device, wherein the hollow shaft of the throttle plate is fluidly coupled to the vacuum consumption device and the constricted portion of the interior passage, where the hollow shaft extends radially outward from the constricted portion of the interior passage through the throttle plate, and through the intake conduit along an axis of rotation of the throttle plate, and wherein the controller includes further instructions for applying the generated vacuum to the vacuum consumption device.

13. The system of claim 12, wherein the adjusting is in response to the vacuum demand of the vacuum consumption device, the controller configured to move the throttle plate towards a more closed position where the intake airflow through the interior passage increases to increase vacuum generation at the throttle plate as the vacuum demand of the vacuum consumption device increases.

14. The system of claim 11, wherein the interior passage is narrowest at the constricted portion, whereby a venturi effect is created at the constricted portion of the interior passage.

15. The system of claim 12, wherein the hollow shaft comprises a first portion that extends radially inward from exterior the throttle plate and is fluidly coupled to a first side of the constricted portion of the interior passage via a first opening, and a second portion that is fluidly coupled to a second side of the constricted portion of the interior passage via a second opening, the second side directly opposite the first side, and where the second portion extends from the second side radially outward into the throttle plate so that a portion of gasses in the interior passage flow into the second portion and back into the interior passage.

16. A method for an engine, comprising:
  connecting a vacuum consumption device via a hollow shaft to a throttle plate positioned in an engine intake passage, the throttle plate having a hollow interior passage; and
  decreasing an opening of the throttle plate when the vacuum consumption device demands vacuum to increase vacuum production at a constricted portion of the hollow interior passage.

17. The method of claim 15, wherein the vacuum consumption device is one of a brake booster, a fuel vapor canister, and a vacuum actuated valve.

18. The method of claim 16, further comprising increasing boost pressure responsive to the decreasing to maintain an engine torque output, the boost pressure increased by increasing a closing of a wastegate coupled across an exhaust turbine via an electronic controller.

19. The method of claim 16, further comprising reducing flow of exhaust residuals from an engine exhaust to the intake passage in response to decreasing the opening of the throttle plate to maintain an engine torque output.

20. The method of claim 16, further comprising, adjusting one or more of a fuel injection amount and a fuel injection timing responsive to the decreasing to maintain engine combustion at stoichiometry.

* * * * *